(12) United States Patent
Chong et al.

(10) Patent No.: US 7,426,630 B1
(45) Date of Patent: Sep. 16, 2008

(54) ARBITRATION OF WINDOW SWAP OPERATIONS

(75) Inventors: Jike Chong, Austin, TX (US); Robert T. Golla, Round Rock, TX (US); Paul J. Jordan, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 444 days.

(21) Appl. No.: 10/881,151

(22) Filed: Jun. 30, 2004

(51) Int. Cl.
G06F 7/38 (2006.01)
G06F 9/00 (2006.01)
G06F 9/44 (2006.01)
G06F 15/00 (2006.01)

(52) U.S. Cl. .................. 712/228; 712/218; 712/244
(58) Field of Classification Search ............... 712/228, 712/218, 244
See application file for complete search history.

(56) References Cited

U.S. PATENT DOCUMENTS

| | | |
|---|---|---|
| 5,046,068 A | 9/1991 | Kubo et al. |
| 5,257,215 A | 10/1993 | Poon |
| 5,313,647 A * | 5/1994 | Kaufman et al. ............ 718/102 |
| 5,339,266 A | 8/1994 | Hinds et al. |
| 5,386,375 A | 1/1995 | Smith |
| 5,515,308 A | 5/1996 | Karp et al. |
| 5,546,593 A | 8/1996 | Kimura et al. |
| 5,619,439 A | 4/1997 | Yu et al. |
| 5,954,789 A | 9/1999 | Yu et al. |
| 6,076,157 A | 6/2000 | Borkenhagen et al. |
| 6,088,788 A | 7/2000 | Borkenhagen et al. |
| 6,088,800 A | 7/2000 | Jones et al. |
| 6,105,127 A | 8/2000 | Kimura et al. |
| 6,131,104 A | 10/2000 | Oberman |
| 6,144,982 A * | 11/2000 | Panwar ...................... 718/104 |
| 6,212,544 B1 | 4/2001 | Borkenhagen et al. |
| 6,282,554 B1 | 8/2001 | Abdallah et al. |
| 6,341,347 B1 | 1/2002 | Joy et al. |
| 6,349,319 B1 | 2/2002 | Shankar et al. |

(Continued)

OTHER PUBLICATIONS

Quammen et al. "Flexible register management for sequential prorams", Apr. 1991, ACM SIGARCH Computer Archirecture News, Proceedings of the 18th annual international symposium on Computer Architecture ISCA'91, vol. 19 Issue 3, ACM press.☐☐.*

(Continued)

*Primary Examiner*—Alford W. Kindred
*Assistant Examiner*—Jesse R Moll
(74) *Attorney, Agent, or Firm*—Lawrence J. Merkel; Meyertons, Hood, Kivlin, Kowert, Goetzel, P.C.

(57) ABSTRACT

In one embodiment, a processor comprises a register file, register management logic coupled to the register file, and at least two sources of window swap operations coupled to the register management logic. The register management logic is configured to control an interface to the register file to switch register windows in the register file in response to one or more window swap operations. The sources of window swap operations and the register management logic are configured to cooperate according to an arbitration scheme to arbitrate between conflicting window swap operations to be performed using the interface. In one particular implementation, for example, block signals may be used from higher priority sources to lower priority sources to block issuance of window swap operations by the lower priority sources.

19 Claims, 15 Drawing Sheets

U.S. PATENT DOCUMENTS

| | | | |
|---|---|---|---|
| 6,357,016 | B1 | 3/2002 | Rodgers et al. |
| 6,397,239 | B2 | 5/2002 | Oberman et al. |
| 6,415,308 | B1 | 7/2002 | Dhablania et al. |
| 6,427,196 | B1 | 7/2002 | Adiletta et al. |
| 6,434,699 | B1 | 8/2002 | Jones et al. |
| 6,496,925 | B1 | 12/2002 | Rodgers et al. |
| 6,507,862 | B1 | 1/2003 | Joy et al. |
| 6,523,050 | B1 | 2/2003 | Dhablania et al. |
| 6,564,328 | B1 | 5/2003 | Grochowski et al. |
| 6,567,839 | B1 | 5/2003 | Borkenhagen et al. |
| 6,594,681 | B1 | 7/2003 | Prabhu |
| 6,606,704 | B1 * | 8/2003 | Adiletta et al. ............... 712/248 |
| 6,625,654 | B1 | 9/2003 | Wolrich et al. |
| 6,629,236 | B1 | 9/2003 | Aipperspach et al. |
| 6,629,237 | B2 | 9/2003 | Wolrich et al. |
| 6,668,308 | B2 | 12/2003 | Barroso et al. |
| 6,668,317 | B1 | 12/2003 | Bernstein et al. |
| 6,671,827 | B2 | 12/2003 | Guilford et al. |
| 6,681,345 | B1 | 1/2004 | Storino et al. |
| 6,687,838 | B2 | 2/2004 | Orenstien et al. |
| 6,694,347 | B2 | 2/2004 | Joy et al. |
| 6,694,425 | B1 | 2/2004 | Eickemeyer |
| 6,697,935 | B1 | 2/2004 | Borkenhagen et al. |
| 6,728,845 | B2 | 4/2004 | Adiletta et al. |
| 6,748,556 | B1 | 6/2004 | Storino et al. |
| 6,801,997 | B2 | 10/2004 | Joy et al. |
| 6,820,107 | B1 | 11/2004 | Kawai et al. |
| 6,847,985 | B1 | 1/2005 | Gupta et al. |
| 6,857,064 | B2 | 2/2005 | Smith et al. |
| 6,883,107 | B2 | 4/2005 | Rodgers et al. |
| 6,889,319 | B1 | 5/2005 | Rodgers et al. |
| 6,898,694 | B2 | 5/2005 | Kottapalli et al. |
| 2004/0003211 | A1 * | 1/2004 | Damron ..................... 712/228 |

OTHER PUBLICATIONS

Alverson et al., "Tera Hardware-Software Cooperation," Tera Computer Company, 1997, (16 pages).

Alverson et al., "The Tera Computer System," Tera Computer Company, 1990 (pp. 1-6).

Alverson et al., "Exploiting Heterogeneous Parallelism on a Multithreaded Multiprocessor," Tera Computer Company, 1992, (pp. 188-197).

Smith et al., "The End of Architecture," 17th Annual Symposium on Computer Arcitecture, Seattle, Washington, May 29, 1990, (pp. 10-17).

Ungerer et al., "A Survey of Processors with Explicit Multithreading," ACM Computing Surveys, vol. 35, No. 1, Mar. 2003, (pp. 29-63).

Patterson et al., "Computer Architecture a Quantitative Approach," Morgan Kaufmann Publishers, Inc., Chapter 3, 1995, (pp. 125-213).

Weaver et al., The SPARC Architecture Manual, Version 9, 1994, (pp. 30-34, 58-49 and 79-85).

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

\* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

Fig. 3

Window 0

| | 31 |
|---|---|
| In Registers 302 | : : |
| | 24 |
| | 23 |
| Local Registers 306 | : : |
| | 16 |
| | 15 |
| Out Registers 304 | : : |
| | 8 |

Window 1

| | 31 |
|---|---|
| In Registers 302 | : : |
| | 24 |
| | 23 |
| Local Registers 306 | : : |
| | 16 |
| | 15 |
| Out Registers 304 | : : |
| | 8 |

Window 2

| | 31 |
|---|---|
| In Registers 302 | : : |
| | 24 |
| | 23 |
| Local Registers 306 | : : |
| | 16 |
| | 15 |
| Out Registers 304 | : : |
| | 8 |

Odd Bank (Window 1 In + Window 0 Local/In area)

Even Bank (Window 0 Out + Window 1 Local + Window 2 In)

Odd Bank (Window 2 Local + Out)

| | 7 | | 7 | | 7 |
|---|---|---|---|---|---|
| Global Registers 300 | : : | Global Registers 300 | : : | Global Registers 300 | : : |
| | 0 | | 0 | | 0 |

Fig. 4

| Odd Bank 312A | 4 Shadows 314A |
|---|---|
| Even Bank 312B | 4 Shadows 314B |
| Local Bank 312C | 8 Shadows 314C |
| Global Bank 312D | 4 Shadows 314D |

ARBITRATION OF WINDOW SWAP OPERATIONS

BACKGROUND

1. Field of the Invention

This invention is related to the field of processors and, more particularly, to register windows and arbitrating swaps of register windows for a register file.

2. Description of the Related Art

Typically, processors implement pipelines to perform the instruction execution process. A pipeline comprises multiple pipeline stages, each of which is assigned one or more operations in support of the overall instruction execution. Different instructions may be in different pipeline stages concurrently, increasing performance by overlapping the execution of the instructions. In some processor designs, instructions of different types (e.g. integer, floating point, graphics, etc.) may have different numbers of pipeline stages. For example, integer pipelines often have fewer pipeline stages than floating point pipelines. The number of pipeline stages in a given pipeline is often referred to as the "depth" of the pipeline. While the pipelines may differ in numbers of stages, some stages may be shared between the pipelines. For example, pipeline stages that implement the fetch and decode of instructions (and sometimes the scheduling of instruction execution) may be shared between the pipelines in some cases.

Some instruction set architectures (ISAs) define the concept of register windows for the registers addressable by the instructions. Generally, the processor may implement a group of registers greater than the number of registers that are directly addressable using instruction encodings. A register window may be a subset of the implemented registers that are available for addressing by instructions at a given point in time. Registers in the currently-active register window (usually referred to as the "current register window" or simply the "current window") are mapped to the register addresses that can be specified in the instructions. If the current register window is changed to another register window, the registers addressable by instructions are changed.

Register windows may be used to accelerate or simplify the processing of procedure calls and returns in some cases. Adjacent register windows may be defined to overlap in the implemented registers, such that some registers are included in both windows. The overlapping registers may be used to pass parameters between the calling procedure and the called procedure. When a procedure call is to be made, a save instruction may be executed that saves the register window of the calling procedure and provides a new, adjacent window for the called procedure. The called procedure may receive parameters in the overlapping registers. When a procedure return is to occur, a restore instruction may be executed to save the called procedure's register window and restore the calling procedure's register window. The overlapping registers may be used to return results of the called procedure. There may be other window management instructions as well. For example, the SPARC® ISA defines a return instruction that restores a register window similar to the restore instruction and that causes instruction execution flow to continue at a target address specified by the return instruction (after executing a delay slot of the return instruction). Additionally, a flushw instruction is defined to flush all active register windows in the processor except the current register window.

The SPARC® ISA defines a register window for 24 of the 32 addressable registers. The remaining registers are global registers which are not affected when the register window is changed. The save and restore instructions are defined to provide the user with the ability to change the current register window to an adjacent register window. Adjacent windows overlap in 8 of the 24 registers in the register window. Accordingly, changing from one register window to an adjacent register window may only involve the changing of state for 16 registers in the window. Changing to a non-adjacent window generally involves changing the state of all 24 of the registers in the window.

SUMMARY

In one embodiment, a processor comprises a register file, register management logic coupled to the register file, and at least two sources of window swap operations coupled to the register management logic. The register management logic is configured to control an interface to the register file to switch register windows in the register file in response to one or more window swap operations. The sources of window swap operations and the register management logic are configured to cooperate according to an arbitration scheme to arbitrate between conflicting window swap operations to be performed using the interface. In one particular implementation, for example, block signals may be used from higher priority sources to lower priority sources to block issuance of window swap operations by the lower priority sources.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

FIG. 4 is a block diagram illustrating one embodiment of register windows.

FIG. 5 is a block diagram illustrating one embodiment of register file banks and shadow copies.

Figure 1:
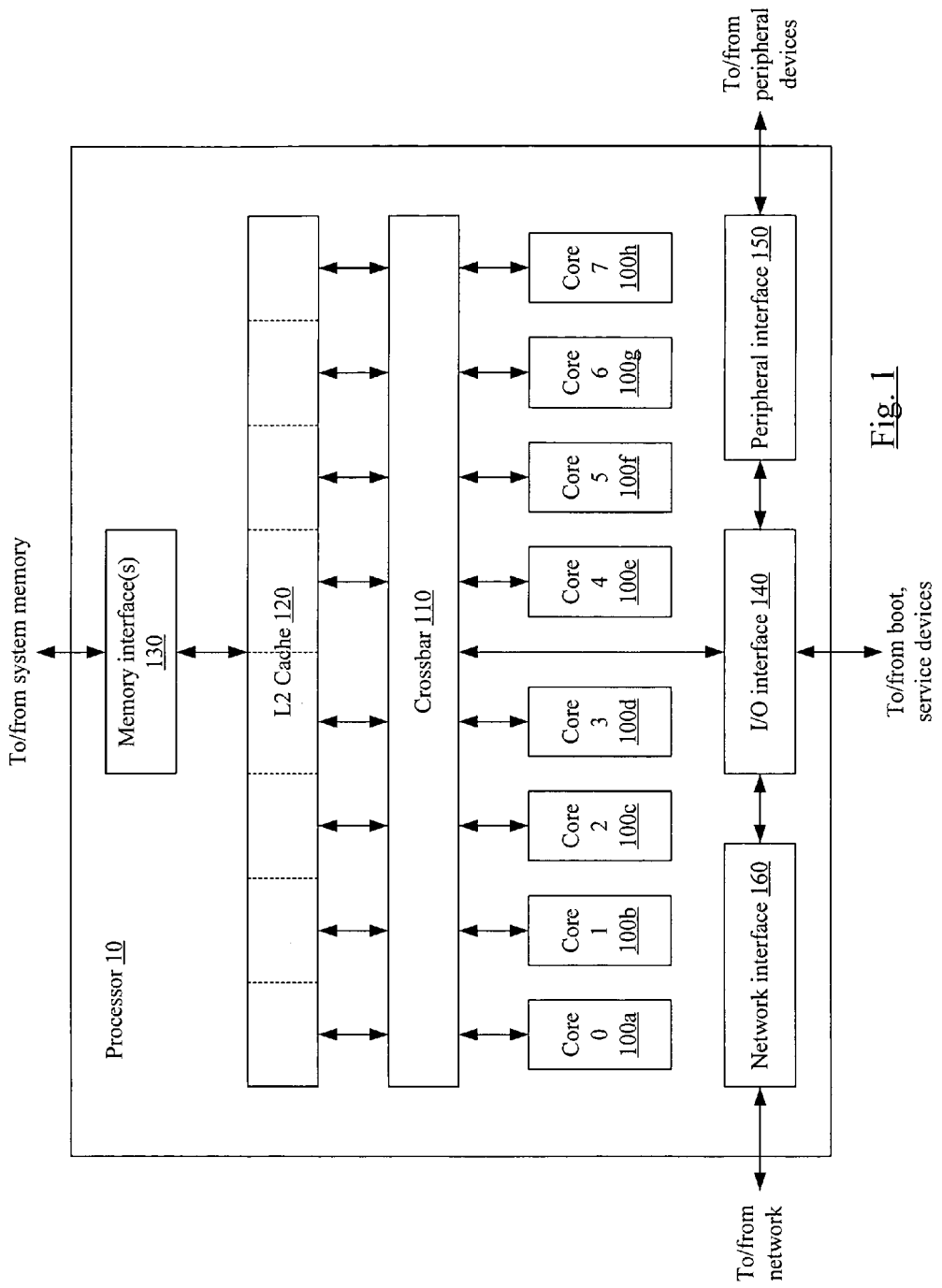
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
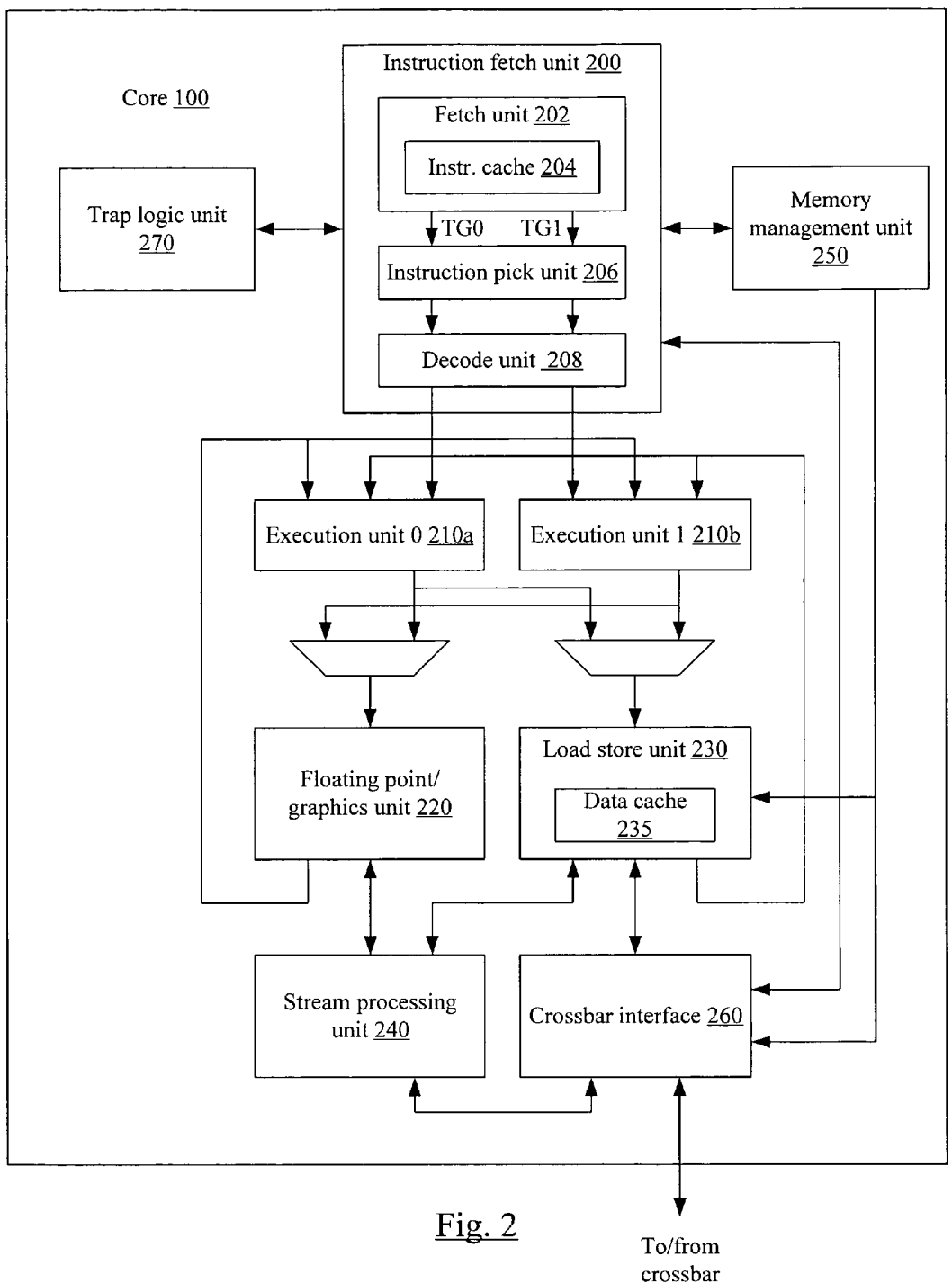
FIG. 2 is a block diagram of one embodiment of a core shown in FIG. 1.

FIGS. 1-3 present an overview of a multithreaded processor 10 that may implement window management as described in more detail below. In other embodiments, the processor may be implement other multithreaded configurations or single threaded configurations, as desired.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Register Windows

In the present embodiment, the processor 10 implements the SPARC V9 ISA, and thus supports the register windows defined in that ISA for the integer registers. Other embodiments may implement other ISAs that define register windows (for integer registers and/or other data type's registers, as desired), using the techniques described herein. The SPARC integer register windows and an implementation of a register file to support such register windows will first be described.

FIG. 4 is a block diagram illustrating one embodiment of exemplary register windows according to the SPARC ISA. Three adjacent windows are shown (window 0, window 1, and window 2). As used herein, a register window is adjacent to another register window if at least one register in the register window overlaps with a register in the other register window. For example, in the SPARC ISA, 8 registers of adjacent windows overlap. Implementations of the SPARC V9 ISA are permitted to implement any number of register windows between 3 and 32. An exemplary embodiment described in more detail herein implements 8 register windows, although any permitted number of windows may be implemented in other embodiments.

At any given point in time, the current window pointer (CWP) stored in a privileged register referred to as the CWP register (not shown in FIG. 4) identifies which of the implemented register windows is the current register window. The save and restore instructions increment and decrement the CWP, respectively, thus changing the current register window to one of the adjacent windows. In FIG. 4, if the CWP indicates window 1, the previous window is window 0 (which may be restored by executing the restore instruction) and the next window to be allocated is window 2 (and window 1 may be saved and window 2 may be allocated by executing the save instruction). The next window to be allocated is referred to herein as the successor window.

As mentioned above, the SPARC ISA defines a 24 register window along with 8 global registers to provide 32 general purpose integer registers that are addressable by instructions at any given point in time. That is, the instructions are encoded with 5 bit register addresses that can be used to address the 32 available integer registers. The register addresses 0 to 7 are assigned to the global registers (reference numeral 300 in FIG. 4). The global registers remain the same as the register windows are changed. The registers in the register window are assigned register addresses 8 to 31. More particularly, the register window may be divided into 3 sections of 8 registers each (the in registers 302, the out Registers 304, and the local Registers 306). The in registers 302 are assigned register addresses 24 to 31, the local registers 306 are assigned register addresses 16 to 23, and the out registers 304 are assigned register addresses 8 to 15. As FIG. 4 illustrates, the in registers 302 in a given register window overlap with the out registers 304 of the previous adjacent window (e.g. the in registers 302 of window 1 overlap with the out registers 304 of window 0). Similarly, the out registers 304 of the given register window overlap with the in registers 302 of the successor adjacent register window (e.g. the out registers 304 of window 1 overlap with the in registers 302 of window 2). The local registers 306 do not overlap with other registers and thus are private to the register window in which they are included. Registers that overlap between two register windows are defined to have the same register state (e.g. an update to an overlapping register in one of the windows affects the state in the overlapping register in the other window). In various implementations, the overlapping registers in each window may or may not refer to the same physical storage location within the register file.

Thus, a programmer writing instruction code according to the SPARC ISA expects integer register addresses 8 to 15 to map to the Out registers 304 of the current register window, the integer register addresses 16 to 23 to map to the local registers 306 of the current register window, and the integer register addresses 24 to 31 to map to the in registers 302 of the current register window. Additionally, the programmer expects the state of the in registers 302 of the current register window to match the state of the out registers 304 of the previous register window and the state of the out registers 304 to match the state of the in registers 302 of the successor register window. The integer register file of the processor 10 is designed to provide this behavior. Various embodiments of the processor 10 may implement one or more of the integer register files.

A variety of register file embodiments may be possible to implement the integer registers, the register windows, and the correct state behavior for the overlapping registers. For example, one embodiment of the integer register file is described in more detail herein for one embodiment of the processor 10. The embodiment implements a set of active registers that can be accessed at any given time. That is, the active registers may be read to provide source operands for instructions and may be written as destinations for results of instructions. The active registers store the register state of the current register window. The remaining implemented registers may be implemented as shadow copies of the active registers. The shadow copies of a given register may store register state that corresponds to another register window (that is, a different register window than the current register window). The shadow copies may not be directly addressable from the ports of the register file, but may be coupled to an active register to either capture state for storage or supply state for storage in the active register in a window swap operation.

In this embodiment, changing the current register window involves saving the current window state (that is, the state of the windowed registers) from the active registers to one of the shadow copies and restoring the window state from another one of the shadow copies to the active registers. The operation of saving at least a portion of the window state to a shadow copy and restoring at least a portion of a different window state from another shadow copy is referred to herein as a "window swap" operation. In some embodiments, a window swap operation may be defined to swap the entire register state of a register window. In other embodiments, the window swap operation may swap a portion of the register state. For example, switching from the current register window to an adjacent register window, in one embodiment described below, includes swapping the state of 16 registers (the 24 windowed registers less the 8 overlapping registers with the current register window). In such embodiments, the window swap operation may swap the state of 16 registers and two window swap operations may be performed to swap all of the registers in the register window.

In some embodiments, each active register may have as many shadow copies as there are implemented register windows and the windowed registers may all be swapped with shadow copies to perform a window swap. However, it is possible to reduce the number of registers for which state is actually swapped when changing from the current register window to an adjacent register window, due to the overlap in registers between the current register window and the adjacent register window. For example, in FIG. 4, the in registers 302 of window 1 have the same state as the out registers 304 of window 0. Additionally, the difference between the register addresses in either window for the overlapping registers is that the most significant bit has the opposite state (e.g. register 31 in window 1 is the same as register 15 in window 0).

In some embodiments, the register file may be implemented with several "banks" of registers corresponding to the different regions of active registers shown in FIG. 4. Particularly, the register file may have a local bank for the active registers that are the local registers (register addresses 16 to 23), a global bank for the active registers that are the global registers (register addresses 0 to 7), and an odd bank and an even bank for the active registers corresponding to the in registers and the out registers (register addresses 8 to 15 and 24 to 31). If the CWP is even, the even register bank is mapped to the in registers and the odd register bank is mapped to the out registers. If the CWP is odd, the even register bank is mapped to the out registers and the odd register bank is mapped to the in registers. This dynamic mapping of the in and out registers to the odd and even register banks may be accomplished, e.g., by selectively changing the state of the most significant bit of register addresses within the in or out register address ranges based on whether or not the CWP is odd or even to generate the address presented to the register file. For example, the least significant bit of the CWP may be exclusive-ORed with the most significant bit of the register address if the register address is within the in and out register address ranges. For save/restore instructions, the destination register address is exclusive-ORed with the least significant bit of the CWP that corresponds to the new register window, if the destination register address is in the in or out register address ranges. FIG. 4 illustrates which registers are the even bank and the odd bank if the CWP for windows 0, 1, and 2 is 0, 1, and 2, respectively.

In the above embodiment, only one of the odd or even bank is swapped in a given window swap operation to an adjacent window, depending on whether the CWP is odd or even and the direction of the swap (e.g. to a previous window or a successor window of the current window). For example, if the CWP is even, the odd bank is swapped if the swap is to the previous window and the even bank is swapped if the swap is to a successor window. If the CWP is odd, the even bank is swapped if the swap is to the previous window and the odd bank is swapped if the swap is to a successor window. The local register bank is swapped in each window swap operation, and the global register bank is unaffected by window swap operations. Thus, swaps to adjacent windows may only cause 16 active registers to change state in embodiments implementing the SPARC ISA.

Switches to non-adjacent windows may also occur (e.g. due to a write directly to the CWP register using a privileged instruction, due to an exception, or due to returning from an exception handler after handling an exception). In such cases, all 24 registers may be swapped for embodiments implementing the SPARC ISA. For example, two window swap operations may be performed (one swapping 16 of the active registers and the other swapping the remaining 8 active registers).

The above embodiment may permit ½ the number of shadow copies for the odd and even register banks, as compared to the number of shadow copies for the local register bank. The local register bank may have a shadow copy for each implemented register window, since the local register state is unique to each window. The odd and even register banks, since they have the same state for pairs of adjacent windows, have ½ the number of shadow copies as the number of implemented registers windows.

FIG. 5 is a block diagram of one embodiment of the active registers 310 and shadow copies 316 for an embodiment of the processor 10 that implements 8 register windows. As described above, the active registers 310 include the odd bank 312A, the even bank 312B, the local bank 312C, and the global bank 312D. Each bank has 8 registers in the present embodiment. The global bank 312D is selected for a register address in the range of 0 to 7. The local bank 312C is selected for a register address in the range of 16 to 23. One of the even or odd banks 312A-312B are selected for registers addresses in the range of 8 to 15 or 24 to 31, dependent on the CWP.

There are 4 shadow copies 314A and 314B corresponding to the odd bank 312A and the even bank 312B, respectively in this embodiment. There are 8 shadow copies 314C of the local bank 312C. Additionally, in this embodiment 4 shadow copies 314D of the global bank 312D are included. The global bank 312D is not swapped on window swap operations, but may include shadow copies based on another mechanism, such as a global level register or global register access control bits of the PSTATE register as defined in the SPARC ISA.

It is noted that FIG. 5 merely illustrates the banks for one embodiment. FIG. 5 is not intended to depict the physical arrangement of the banks.

Figure 6:
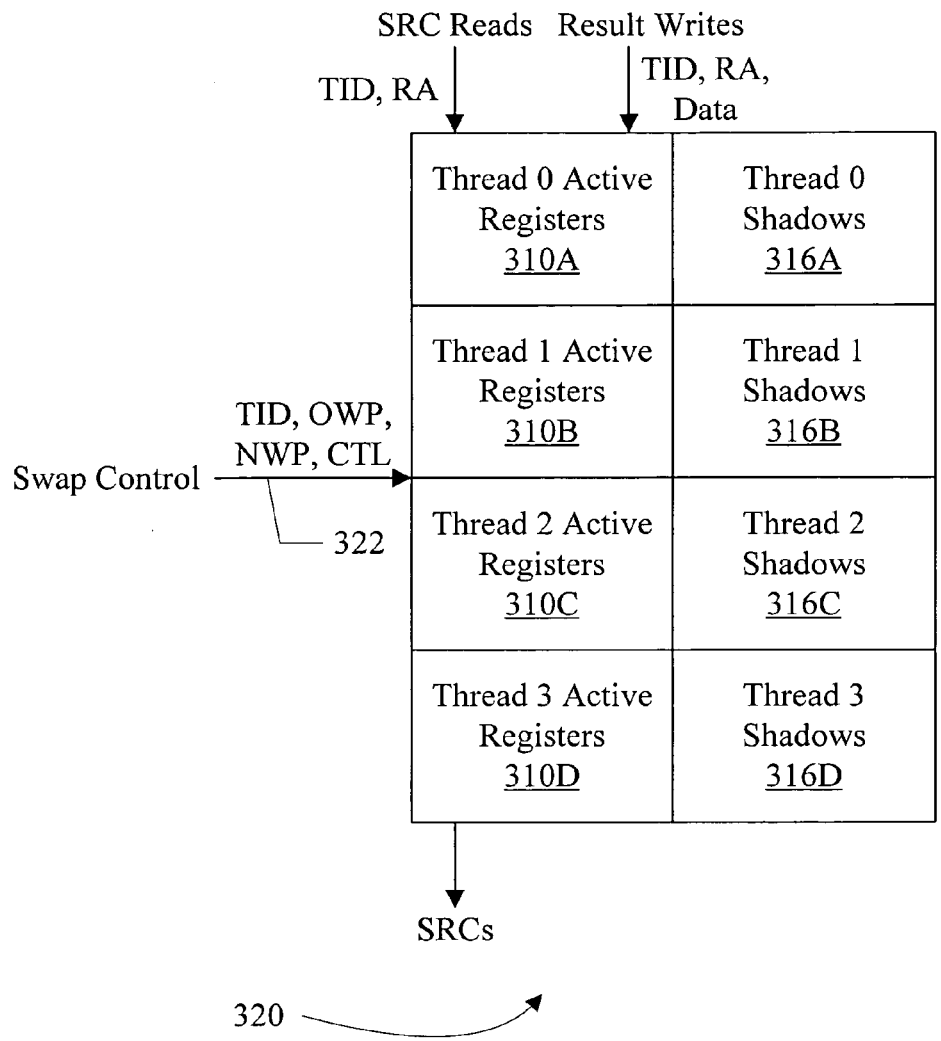
FIG. 6 is a block diagram illustrating one embodiment of a register file supporting multiple threads and windows.

FIG. 6 is a block diagram of one embodiment of an integer register file 320 that may be implemented by a core 100 shown in FIG. 2. The embodiment of FIG. 6 supports 4 threads (the number of threads in a thread group in the present embodiment, although other embodiments may or may not implement thread groups and may implement more or fewer threads per thread group). Accordingly, the register file 320 includes a set of active registers 310 and corresponding shadow copies 316 for each thread (e.g. active registers 310A and shadow copies 316A for thread 0, active registers 310B and shadow copies 316B for thread 1, etc.).

The register file 320 may include one or more read ports for source register reads (SRC reads in FIG. 6). Each read port may include a thread identifier (TID) that selects one of the sets of active registers 310A-310D for the read, and a register address (RA) that selects the particular register within the set of active registers. The RA may generally be drawn from the instruction encoding, except for the most significant bit of the RA if the RA is within the in or out register address range, as described above. Each read port may also include an output on which the corresponding register state is provided (SRCs in FIG. 6). In one embodiment the register file 320 may include 3 read ports, although any number may be provided in other embodiments.

The register file 320 may also include one or more write ports for writing instruction execution results into the register file 320. The write ports may include the TID and RA, similar to the read ports, and may include a data input for supplying the result to update the register. In one embodiment the register file 320 may include 2 write ports, although any number may be provided in other embodiments.

The register file 320 may also include a swap control interface 322 used to swap the active registers 310A-310D for a given thread. The swap control interface 322 may include a thread identifier (TID), an old window pointer (OWP) identifying the shadow copy to be updated with the current active register states, a new window pointer (NWP) identifying the shadow copy from which register states are to be restored to the active registers 310A-310D for the thread, and various control signals (CTL). For example, the control signals may include signals indicating which of the odd or even banks to swap, signals to initiate the swap, etc. In one embodiment, each shadow copy is associated with a different one of the CWPs (or pairs of CWPs, in the case of the odd and even banks) and stores register states corresponding to that CWP. The OWP and NWP select the shadow copies involved in a window swap.

While the embodiment of FIG. 6 supports multiple threads, other embodiments are contemplated that support only a single thread. For example, separate register files may be provide for each thread. In other embodiments, processor 10 (or core 100) may be single threaded.

As used herein, the term window state may refer to the set of register states that correspond to a register window. A register window may be established in the register file when the window state corresponding to that register window is the state that will be provided or updated in response to register file reads and writes. For example, in the embodiment of FIGS. 5-6, the register window is established when the window state has been copied into the active registers of the register file.

Window Swap Arbitration

In one embodiment, the processor 10 may include register management logic (e.g. reference numeral 330 in FIG. 7, described in more detail below) configured to manage the swap control interface 322 on the register file 320. The register management logic 330 may implement a pipeline for performing window swap operations within the execution unit 210A-210B that includes the register management logic 330. There may be separate instances of the register file 320 for each of the execution units 210A-210B, and the register management logic 330 in the respective execution units 210A-210B may control the swap control interface 322 on the respective instance of the register file 320.

In various embodiments of processor 10, there may be multiple sources of window swap operations. For example, instructions being executed may source one or more window swap operations. The save and restore instructions, for example, cause a window swap operation to switch from the current register window to the successor window and the previous window, respectively, if no exception occurs during their execution. Similar to the restore instruction, the return instruction causes a window swap operation to switch from the current register window to the previous window. The flushw instruction causes a switch to a non-adjacent window to permit spilling the register state corresponding to the register window in an exception handler. Instructions which cause one or more window swap operations during execution are referred to herein as "window swap instructions". If an instruction causes one window swap operation, the instruction may use the window swap pipeline as the instruction passes through the execution unit 210A-210B.

Window swap instructions which normally cause a switch to an adjacent window may experience exceptions which cause a switch to a non-adjacent window. In the present embodiment, two window swap operations are used to complete the switch to the non-adjacent window. Thus, the execution unit that executes the instruction may be the source of the second window swap operation (via detection of the exception). For example, the save instruction may experience a spill exception if executed when no windows are available to be allocated (a window overflow condition). The window swap operations are used in this case to switch to the window that is to be spilled to memory. Clean window exceptions may also occur during execution of the save instruction if the window to be allocated contains data from another process. Since the switch is to an adjacent window, the window swap operation may be handled as the save instruction passes through the pipeline. Similarly, restore/return instructions may experience a window fill exception if the restored window is not valid (a window underflow condition). Again, the window fill exception is for an adjacent window and the window swap may be handled as the restore/return instruction passes through the pipeline. The flushw instruction generally causes a spill exception to a non-adjacent window (unless all the register windows except for the current register window are not valid), and thus two window swap operations are used for the flushw spill exception.

Another source of window swap operations may be the trap logic unit 270, in one embodiment. The trap logic unit 270 may initiate one or more window swap operations as part of returning from an exception handler to user code, for example. The trap logic unit 270 may often initiate window swap operations to switch to a non-adjacent window, and thus two window swap operations are used.

Yet another source of window swap operations may be direct writes to the CWP register (via execution of privileged instructions that target the CWP). Changing the CWP changes the register window (potentially to a non-adjacent window), and thus a CWP write causes two window swap operations, in general. In one embodiment, such privileged register writes are initiated in the load/store unit 230. Thus, logic in the load/store unit 230 may be a source of window swap operations.

The window swap operations from various sources may conflict. In general, two window swap operations are conflicting if they both would arrive at the register management logic 330 at the same time (and thus would attempt to use the window swap pipeline at the same time). Since there is one pipeline for performing window swap operations in the present embodiment, if both arrive at the same time, there is a conflict for using the pipeline. In a multithreaded embodiment, with multiple threads accessing state in the register file 320, the potential for conflict increases. That is, various sources of window swap operations may source conflicting window swap operations generated from different threads.

The register management logic 330 and the various sources of window swap operations may participate in an arbitration scheme to arbitrate the conflicting window swap operations. Generally, an arbitration scheme specifies how one of multiple requesters of a shared resource is selected to use the resource. In this case, the shared resource is the window swap pipeline and the requestors are the sources of window swap operations.

In general, any arbitration scheme may be used. In one embodiment, each source is assigned a priority level in the arbitration scheme. Priority levels may be static or change dynamically, in various embodiments. In one particular implementation, a static priority scheme is implemented in which a window swap instruction that has an exception is assigned the highest priority level (for its second window swap operation), a TLU-initiated window swap operation has the second highest priority level, a direct update from a privileged instruction to the CWP has the third highest priority level, and a window swap instruction that is ready to be issued for execution has the fourth highest priority level. Other embodiments may use different priorities, as desired.

The arbitration scheme may be implemented in a variety of fashions in various embodiments. For example, each source may signal a central arbiter if the source has a window swap operation to initiate, and the central arbiter may select a winner. A distributed scheme may be used, in which each source signals each other source when it has a window swap operation to initiate, and each source independently determines the same winner using the requests.

In the present embodiment, the arbitration scheme is implemented using block signals from one or more sources to signal other sources ("receiving sources") that may potentially have a lower priority window swap operation to initiate, to cause the receiving sources not to initiate the lower priority window swap operation. If the receiving sources do not have a window swap operation to initiate, operation of the receiving sources is not affected by assertion of the block signal. If a receiving source does have a window swap operation to initiate and the block signal is asserted, the receiving sources may stall the window swap operation.

Figure 7:
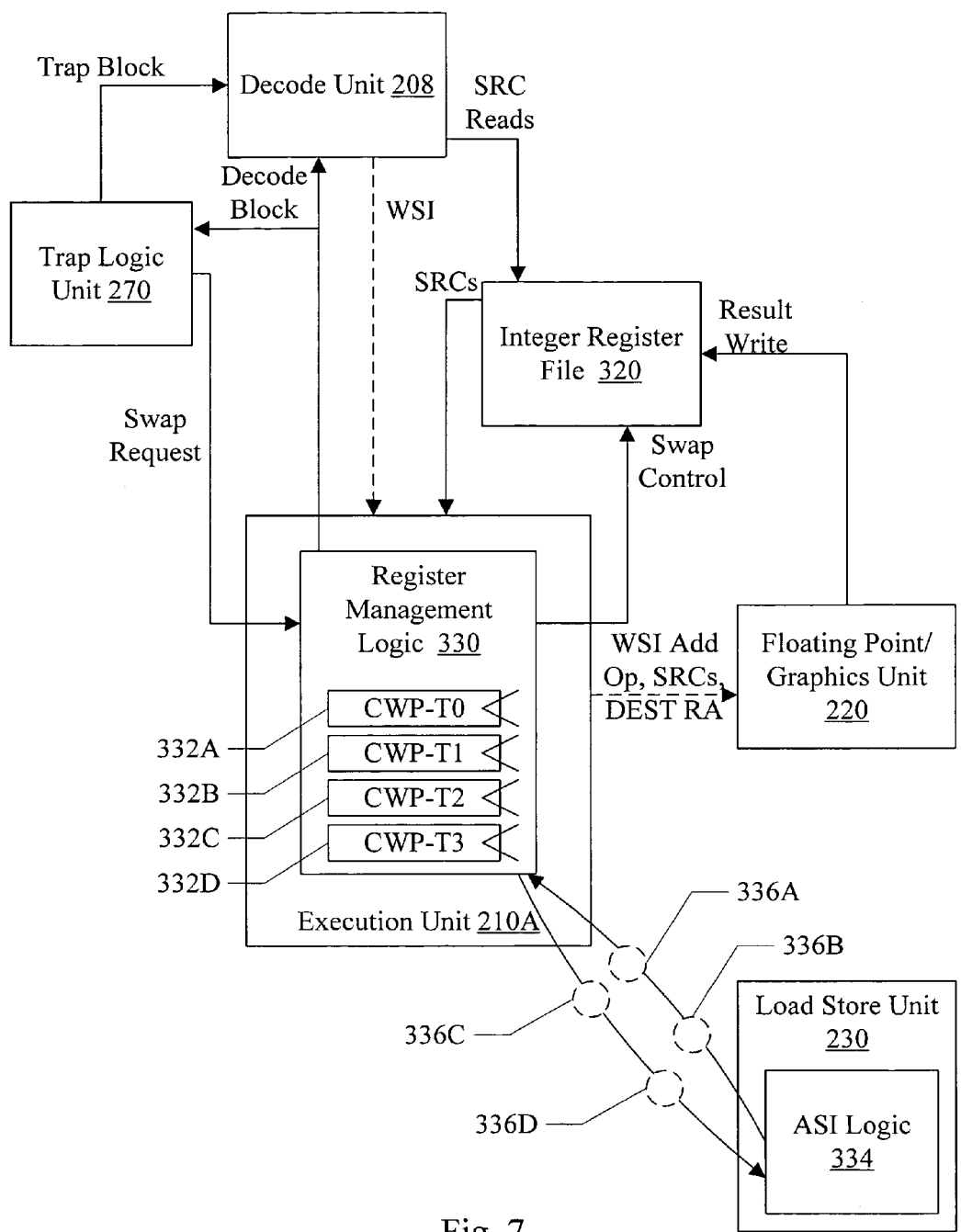
FIG. 7 is a block diagram of one embodiment of a decode unit, a register file, an execution unit, a floating point/graphics unit, a load/store unit, and a trap logic unit illustrating flow of a window swap instruction and various window swap operation sources

FIG. 7 illustrates one embodiment of such a blocking scheme for one embodiment of the processor 10. One of the receiving sources may be the decode unit 208, which may be configured to provide a one cycle stall of an instruction that specifies a window swap operation in response to one or more block signals. The stall of the instruction provides a window swap hole in the pipeline, which may be used by the higher priority source to perform its window swap operation.

Turning now to FIG. 7, a block diagram is shown illustrating a portion of one embodiment of a core 100 that may be used to perform window swap operations. In the embodiment of FIG. 7, the decode unit 208 is shown, along with the integer register file 320, the execution unit 210A (which includes register management logic 330, which further includes a plurality of current window pointer registers 332A-332D, one for each thread that may be executed by the execution unit 210A), the floating point/graphics unit 220, and the load/store unit 230 (which includes address space identifier (ASI) logic 334). In the illustrated embodiment, the decode unit 208 is coupled to the execution unit 210A and the integer register file 320. The execution unit 210A is coupled to the integer register file 320 and the floating point/graphics unit 220, which is further coupled to the integer register file 320. The execution unit 210B may include similar connections to the decode unit 208 and the floating point/graphics unit 220, and a second instance of the integer register file 320 may be coupled to the execution unit 210B.

The register management logic 330 is coupled to provide a decode block signal to the decode unit 208 and the trap logic unit 270. The trap logic unit 270 is further configured to provide a trap block signal to the decode unit 208, and a swap request to the register management logic 330. The block signals from the register management logic 330 and the trap logic unit 270 may be used to implement the arbitration scheme described previously.

Particularly, the register management logic 330 may assert the decode block signal in response to detecting an exception on a window swap instruction that causes a second window swap operation to occur (e.g. the window established for the exception handler is a non-adjacent window). The decode unit 208, if currently decoding a window swap instruction for issue to the execution unit 210A, stalls the window swap instruction. If the decode unit 208 is not decoding the window swap instruction, the decode unit 208 need not stall the instruction since the instruction does not use the window swap pipeline.

The trap logic unit 270 also receives the decode block signal (or a physically different signal that is logically the same as the decode block signal). If the trap logic unit 270 has one or more window swap operations to initiate (e.g. due to a retry or done instruction that changes the CWP) and the decode block signal is asserted, the trap logic unit 270 inhibits initiating the window swap operations. Operation of the trap logic unit 270 that does not include initiating window swap operations may be unaffected by the decode block signal assertion.

Additionally, if the trap logic unit 270 has one or more window swap operations to initiate and the decode block is not asserted, the trap logic unit 270 may assert the trap block signal to the decode unit 208. The decode unit 208 may treat the trap block signal similar to the decode block signal. That is, the decode unit 208 may stall a window swap instruction, if any, that is to be issued to the execution unit 210A, thereby creating a window swap hole in the pipeline that the trap logic unit 270 may use for a window swap operation. The trap logic unit 270 may transmit the request for the window swap operation to the register management logic 330 ("swap request" in FIG. 7). The swap request may include, e.g., the new CWP value, the thread ID indicating which thread is affected by the window swap operation, and a valid bit.

The ASI logic 334 may be configured to manage the update of various privileged registers that are directly updateable in the ASI space via the execution of privileged instructions. One such register is the CWP register, and changing the CWP register causes window swap operations to change the current register window to reflect the changed CWP. The register management logic 330 includes CWP registers 332A-332D corresponding to the various threads executable in the execution unit 210A.

The ASI logic 334 may communicate with the register management logic 330 (and other circuitry that controls registers that may be address in the ASI space, represented by nodes 336A-336D in FIG. 7) via an ASI ring in the present embodiment. Circuitry that communicates with the ASI logic 334 via the ASI ring is referred to as a node on the ring. Thus, the register management logic is a node on the ASI ring, as are the nodes 336A-336D. Other embodiments may use any other communication scheme. The ASI logic 334 may generate packets on the ASI ring, which may propagate from node to node on the ring. The destination node may receive the packet from the ring for processing, and may respond with an acknowledgement on the ring, exception status, etc.

If the register management logic 330 receives a packet on the ring with a write request for one of the CWP registers 332A-332D, the register management logic 330 may ensure that other window swap operations are not outstanding and then may initiate window swap operations using the new CWP value from the packet. The register management logic 330 may assert the decode block signal to create the window swap holes in the pipeline to perform the window swap operations. In one embodiment, the CWP update may be implemented as an indeterminate length operation on the ASI ring, to permit the register management logic 330 to delay performing the CWP update until the window swap operations are performed. Once the window swap operations are complete, the register management logic 330 may update the identified CWP register 332A-332D.

In the illustrated embodiment, the decode unit 208 is configured to decode instructions and, if the instruction has one or more integer source operands, is configured to generate source register reads on one or more of the integer register file read ports. The integer register file 320 is configured to provide corresponding source operands to the execution unit 210A. The decode unit 208 also decodes the instruction and transmits the instruction to the execution unit 210A. Particularly, as shown in FIG. 7, the decode unit 208 may transmit the decoded window swap instruction (WSI, dotted line in FIG. 7) to the execution unit 210A.

The execution unit 210A (and specifically the register management logic 330) is configured to perform the window swap operation specified by the window swap instruction. The register management logic 330 is coupled to the swap controls on the integer register file 320 to effect the swap.

The execution unit 210A is also coupled to provide the add operation of certain window swap instructions, such as the save and restore instructions, to the floating point/graphics unit 220 (WSI Add Op in FIG. 7). Additionally, the execution unit 210A is coupled to provide the integer source operands and the register address of the destination in the integer register file 320 to the floating point/graphics unit 220. The floating point/graphics unit 220 is configured to perform the add operation on the source operands and to write the result into the integer register file 320 using one of the write ports. In the present embodiment, a floating point or graphics instruction is also transmitted by the decode unit 208 to the execution unit 210A (or 210B, depending on thread group), which then transmits the floating point or graphics instruction to the floating point/graphics unit 220. Other embodiments may transmit floating point or graphics instructions directly from the decode unit 208 to the floating point/graphics unit 220.

It is noted that, while the floating point/graphics unit 220 executes floating point instructions in this embodiment, other embodiments may implement a dedicated floating point unit that executes only floating point instructions. In yet other embodiments, an execution unit that executes both floating point instructions and one or more other types of instructions different than graphics instructions may be provided.

Figure 8:
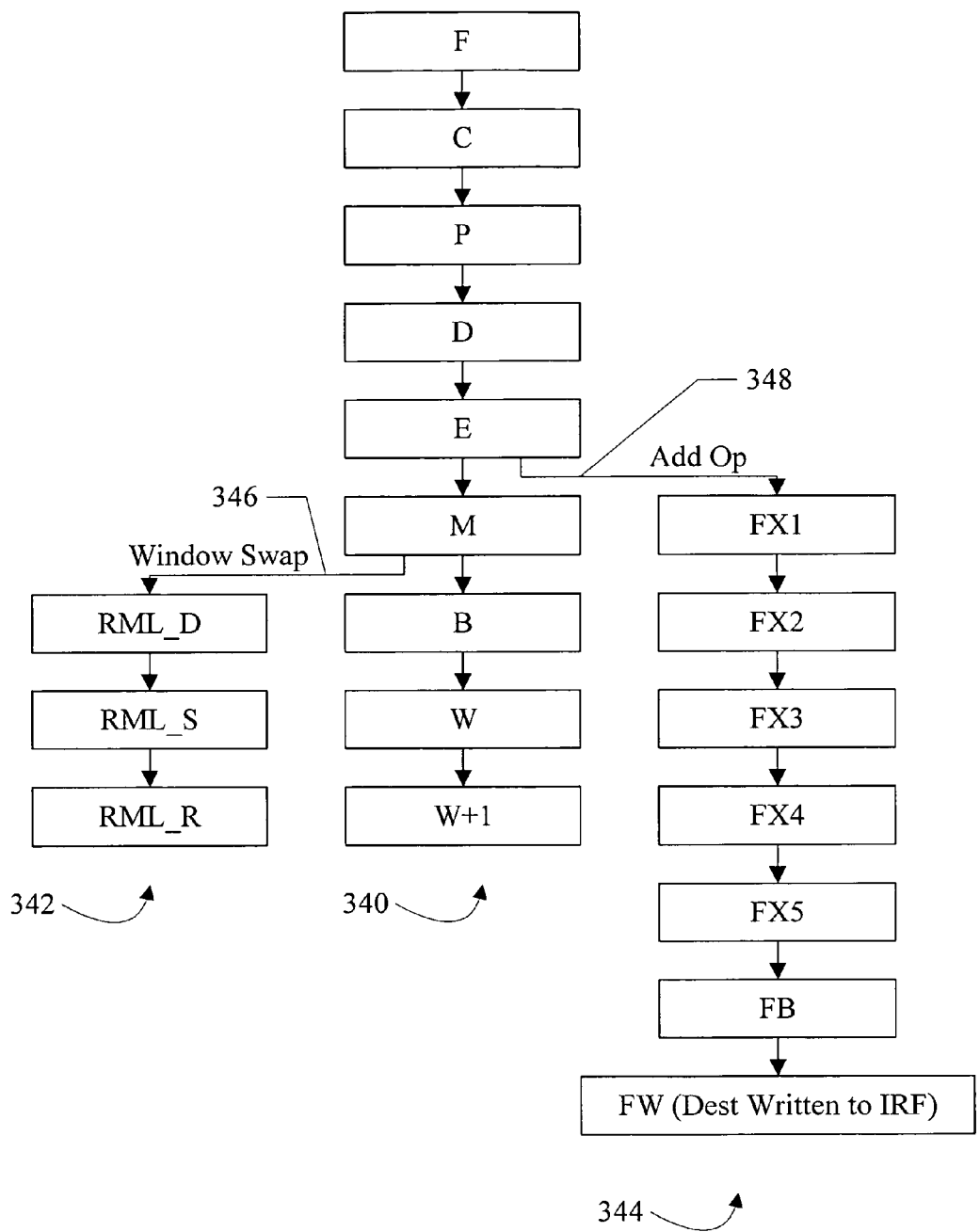
FIG. 8 is a pipeline diagram illustrating one embodiment of pipelines having different depths.

Turning now to FIG. 8, a pipeline diagram is shown illustrating one embodiment of a set of pipelines that may be implemented by the core 100. Pipeline stages that are horizontally adjacent in FIG. 8 occur in the same clock cycle for instructions that enter the pipelines on the same clock cycle. That is, horizontally adjacent pipeline stages are in parallel. A portion of the front end of the pipelines are common, and are only shown once in FIG. 8. That is, the fetch (F), cache (C), pick (P), decode (D), and execute (E) stages are common between the integer and floating point pipelines in this embodiment.

The integer pipeline is shown in the center in FIG. 8 (reference numeral 340). The integer pipeline is generally associated with the execution unit 210A (and the load/store unit 230, for load/store operations) since the execution unit 210A executes most integer instructions. The integer pipeline includes the F, C, P, D, E, M, B, and W stages described above with regard to FIG. 3, and also includes a writeback plus one (W+1) stage at which the write of a result to the integer register file 230 is performed if no exceptions occur.

The register management logic 330 also implements a pipeline for performing the window swap operation, illustrated on the left side in FIG. 8 (reference numeral 342). The register management logic pipeline may be viewed as part of the integer pipeline in some respects, but is shown in FIG. 8 to illustrate the stages of the window swap operation. The register management logic 330 uses three stages for the window swap operation in this embodiment: a decode stage (RML_D), a save stage (RML_S), and a restore stage (RML_R). Other embodiments may use more or fewer stages.

The execution unit 210A provides the window swap operation to the register management logic from the M stage (arrow 346). In the RML_D stage, the register management logic 330 decodes the window swap operation to generate the swap controls for the integer register file 320. In the RML_S stage, the register management logic 330 asserts the controls on the swap control interface to save the current register state from the active registers to the appropriate shadow copy. That is, the register state is copied from the active registers to the shadow copy. In the RML_R stage, the register management logic 330 asserts the controls on the swap control interface to restore the register state in the active registers from the shadow copy corresponding to the new register window. That is, the register state is copied from the shadow copy to the active registers.

The RML_D stage parallels the B stage of the integer pipeline in the embodiment of FIG. 8. Similarly, the RML_S stage parallels the W stage of the integer pipeline and the RML_R stage parallels the W+1 stage of the integer pipeline. Thus, once the window swap instruction reaches the W+1 stage, the new register window is established in the register file 330 for a swap to an adjacent window.

The floating point pipeline is illustrated on the right side in FIG. 8 (reference numeral 344). The floating point pipeline is generally associated with the floating point/graphics unit 220 and has the F, C, P, D, and E stages in common with the integer pipeline. After the E stage, the floating point pipeline includes five execute stages FX1, FX2, FX3, FX4, and FX5, a bypass stage (FB) similar to the B stage in the integer pipeline, and a floating point writeback stage (FW) at which the result is written.

The save and restore instructions in the SPARC ISA are defined to perform an add operation on two source operands read from the old register window (prior to executing the save/restore instruction) and storing the result in a destination register in the new register window (established as a result of executing the save/restore instruction). In the present embodiment, the add operation may be performed in the floating point pipeline to take advantage of its added depth, establishing the new register window prior to the add result being written. In particular, the result of the add operation specified for the save and restore instructions is written to the integer register file 320 from the FW stage.

In the illustrated embodiment, the FX1 stage parallels the M stage of the integer pipeline. Similarly, the FX2 stage parallels the B stage of the integer pipeline; the FX3 stage parallels the W stage of the integer pipeline; and the FX4 stage parallels the W+1 stage of the integer pipeline. The FX5, FB, and FW have no parallel stages in the integer pipeline. That is, the floating point pipeline exceeds the depth of the integer pipeline by three stages in the illustrated embodiment.

The execution unit 210A transmits the add operation (and source operands and destination register address) to the floating point/graphics unit 220 from the E stage (arrow 348). The add operation is performed as the add operation flows through the FX1-FX5, FB, and FW stages, and the result is written to the integer register file 320 in the FW stage. At this point, the new register window has been established in the register file 320 for three clock cycles in the illustrated embodiment. Thus, the result is correctly written to the new register window.

While the floating point pipeline exceeds the depth of the integer pipeline by three stages in the present embodiment, the pipeline that performs the add operation of the window swap instruction may generally exceed the depth of the pipeline that performs the window swap operation by one or more stages. It is noted that, in other embodiments, the decode unit 208 may dispatch the add operation of the window swap instruction to the floating point unit 220 from the D stage (rather than the execution unit dispatching the add operation from the E stage). Similarly, the window swap operation may be started from the E stage or the D stage, in some embodiments.

As mentioned above, in cases of exceptions, a window swap may occur to a non-adjacent window. In embodiments that implement the odd/even register banks and swap 16 registers for the window swap instructions, a second window swap operation may be used to swap the remaining registers in the event of an exception. That is, the first window swap operation, occurring as the window swap instruction is executed, may swap 16 of the registers to the non-adjacent window. The add operation for the window swap instruction may be cancelled if an exception occurs. In one embodiment, exceptions on the window swap instructions are detected in the M stage in the above pipeline, and thus the window swap operation for the window swap instruction may be used to swap 16 of the registers to the non-adjacent window.

Figure 9:
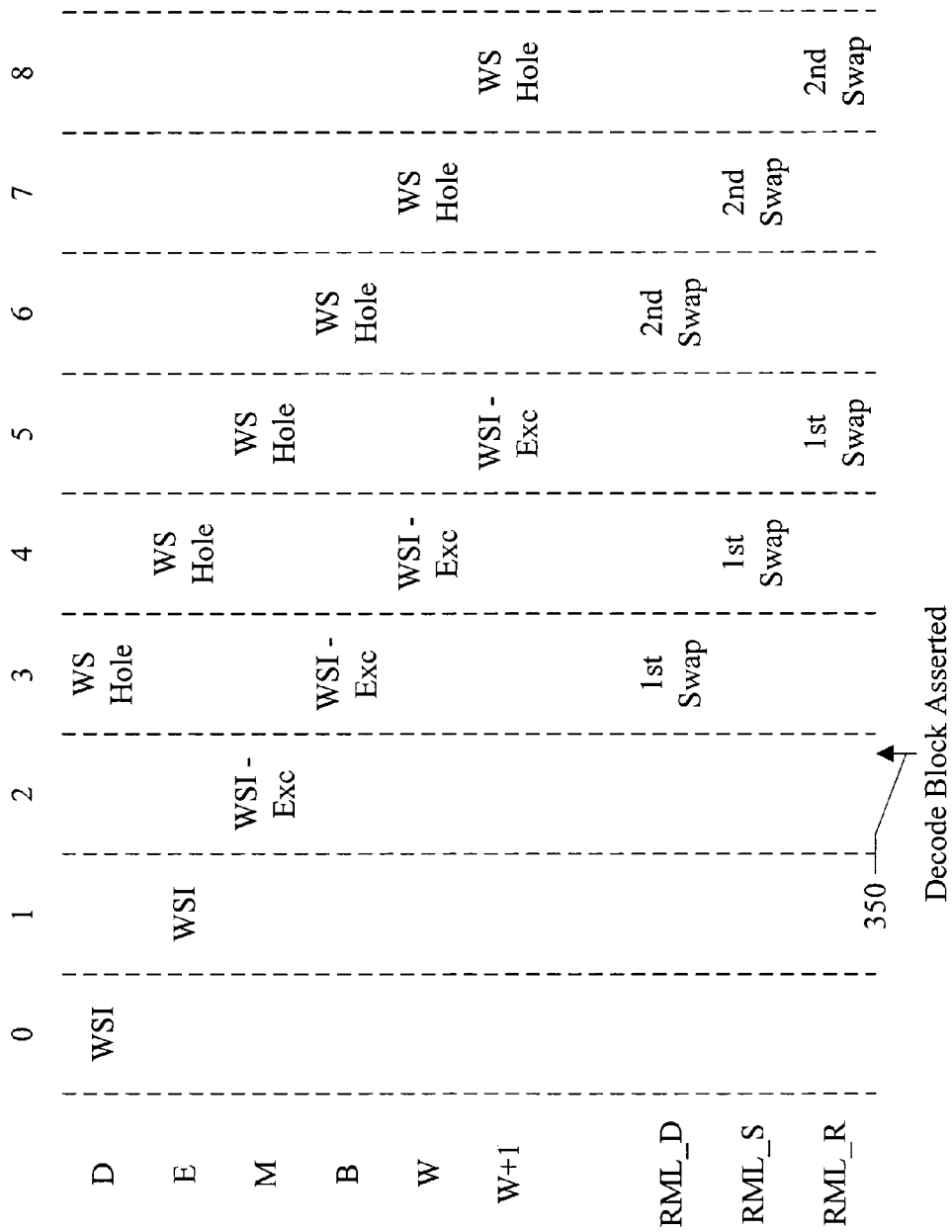
FIG. 9 is a timing diagram illustrating one embodiment of executing a window swap instruction that experiences an exception that causes more than one window swap operation.
Figure 10:
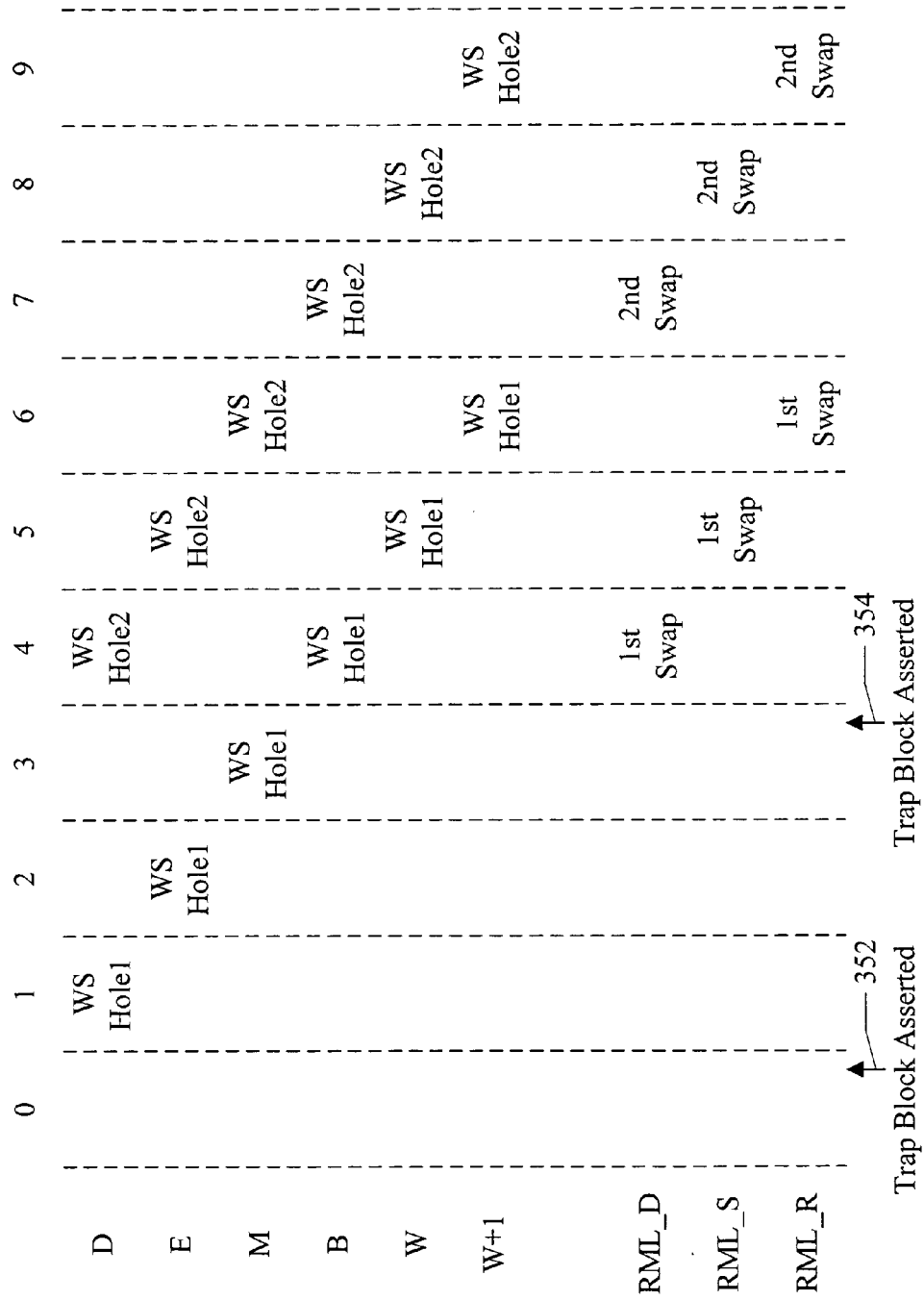
FIG. 10 is a timing diagram illustrating one embodiment of performing more than one window swap operation initiated by the trap logic unit.
Figure 11:
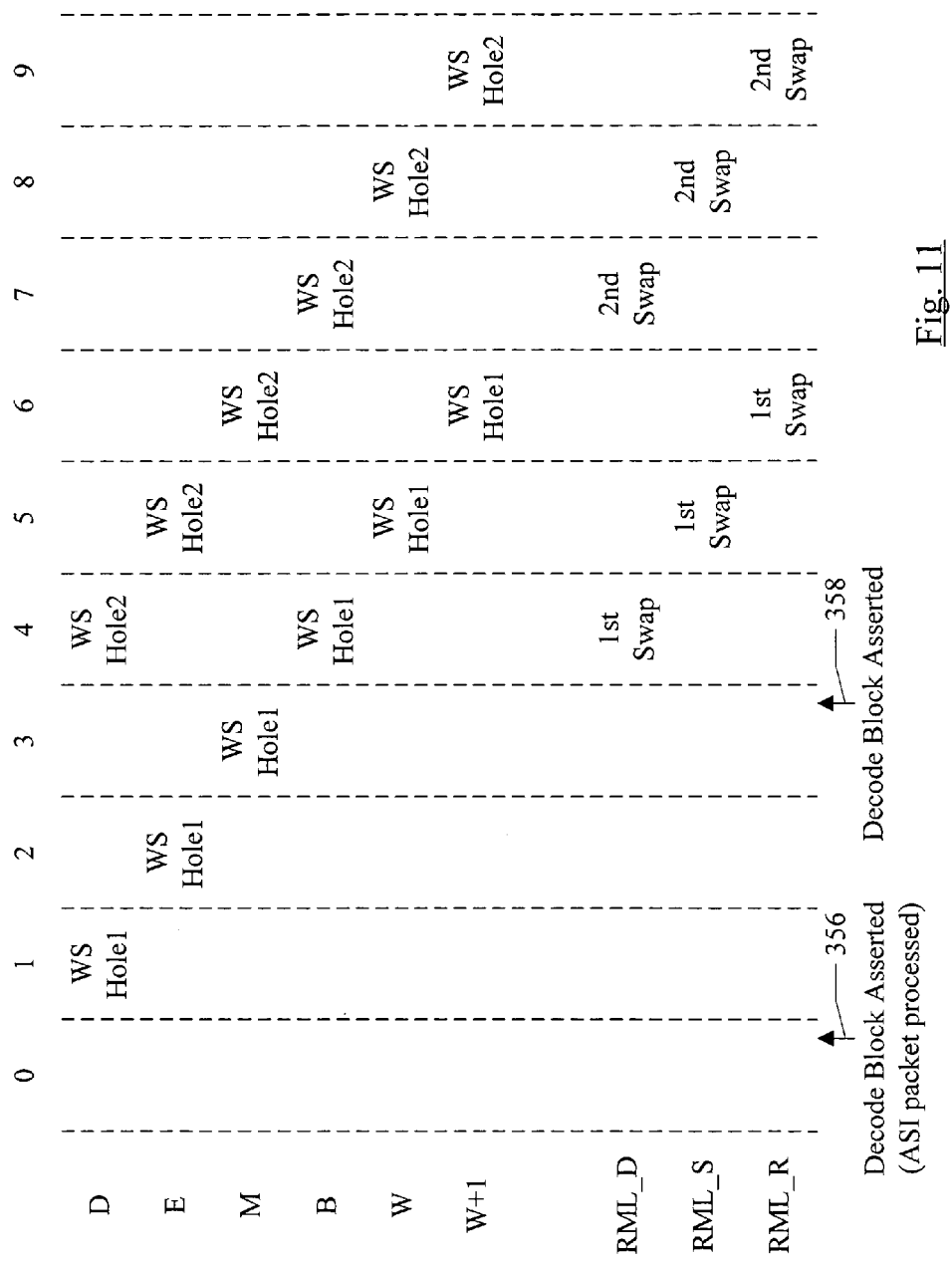
FIG. 11 is a timing diagram illustrating one embodiment of performing more than one window swap operation in response to a direct update of a current window pointer register.

Turning now to FIGS. 9-11, timing diagrams are shown illustrating the use of the decode block and trap block signals to create window swap holes in the pipeline to permit window swap operations to be inserted from sources other than the decode unit 208. Clock cycles are illustrated in FIGS. 9-11 with vertical dashed lines. Each clock cycle is labeled at the top with a number (clock cycle 0, 1, 2, etc.). Pipeline stages of the integer pipeline, beginning with the D stage, are illustrated to the left of each timing diagram. Additionally, the window swap pipeline stages are shown to the left of each timing diagram.

FIG. 9 illustrates one embodiment of the use of the decode block signal to open a window swap hole in the pipeline for performing the second swap operation for a window swap instruction that experiences an exception that causes a switch to a non-adjacent window. The window swap instruction itself (WSI in FIG. 9) is shown flowing through the pipeline, beginning with the D stage in clock cycle 0 and flowing through to the W+1 stage in clock cycle 5. In this embodiment, the exception is detected in the M stage (WSI-Exc in clock cycle 2). Responsive to the exception, the register management logic 330 asserts the decode block signal (arrow 350). The decode unit 208 receives the asserted decode block signal. If, in clock cycle 3, the decode unit 208 decodes an instruction that causes a window swap operation for the execution unit 210A, the decode unit 208 stalls that instruction. Otherwise, the decode unit 208 does not stall the instruction. In either case, a window swap hole is created at the decode state in clock cycle 3 (WS Hole in FIG. 9). The window swap hole flows through the pipeline beginning at clock cycle 3 and ending at the W+1 state in clock cycle 8.

The first window swap operation for the exception uses the window swap pipeline as the instruction having the exception flows through the pipeline, illustrated as "1st swap" in FIG. 9 in clock cycles 3, 4, and 5. That is, the first window swap operation is performed in the window swap pipeline in the clock cycles that the instruction itself would use the window swap pipeline. The second window swap operation uses the WS Hole slot created via assertion of the decode block signal, which occurs in the window swap pipeline in clock cycles 6, 7, and 8 ("2nd swap" in FIG. 9).

The first window swap operation and the flowing of the WSI through the pipeline in FIG. 9 is similar to the operation of the window swap instruction when no exception occurs.

That is, a window swap instruction with no exception and its single window swap operation may be similar to the WSI and the 1st swap shown in FIG. 9, except that the decode block signal is not asserted and no exception is detected.

FIG. 10 illustrates one embodiment of the trap logic unit 270 using the trap block signal to perform window swap operations initiated by the trap logic unit 270 to switch to a non-adjacent window. In clock cycle 0, the trap logic unit 270 checks for assertion of the decode block signal, which signifies a window swap operation arbitrating for a window swap hole. If the decode block signal is deasserted, the trap logic unit 270 asserts the trap block signal (arrow 352). The decode unit 208 responds to the trap block signal by inserting a window swap hole (WS Hole1 in FIG. 10) in clock cycle 1 (either by stalling an instruction that causes a window swap operation or by determining that the instruction being issued does not cause a window swap operation and issuing the instruction). The window swap hole flows through the pipeline in clock cycles 1 to 6 in FIG. 10. The first window swap operation initiated by the trap logic unit is performed in the window swap pipeline in clock cycles 4, 5, and 6 ("1st swap" in FIG. 10). Additionally, the trap logic unit 270 asserts the trap block signal again in clock cycle 3 (arrow 354) to generate a second window swap hole ("WS Hole2" in FIG. 10). The second window swap hole flows through the pipeline in clock cycles 4 through 9, and the second window swap operation is performed in the window swap pipeline in clock cycles 7, 8, and 9 ("2nd swap" in FIG. 10).

For each window swap operation, the trap logic unit 270 transmits a swap request to the register management logic 330. In some embodiments, the trap logic unit 270 may transmit the swap request during the same clock cycle as asserting the trap block signal. Alternatively, the trap logic unit 270 may transmit the swap request to coincide with the arrival of the corresponding window swap hole in E stage or M stage of the pipeline.

While the example of FIG. 10 illustrates the trap logic unit 270 spacing the trap block assertions for the two window swap operations by three clock cycles, other embodiments may use other spacings (including using consecutive clock cycles or any desired number of clock cycles).

FIG. 11 is an example of the register management logic 330 using the decode block signal for performing the window swaps due to receiving an ASI packet containing an update to one of the current window pointer (CWP) registers 332A-332D. The example of FIG. 11 is similar to the example of FIG. 10, except that decode block signal assertions are used (arrows 356 and 358 in clock cycles 0 and 3). As mentioned above, the two assertions of the decode block signal may be consecutive, or separated by other numbers of clock cycles, in other embodiments.

Figure 12:
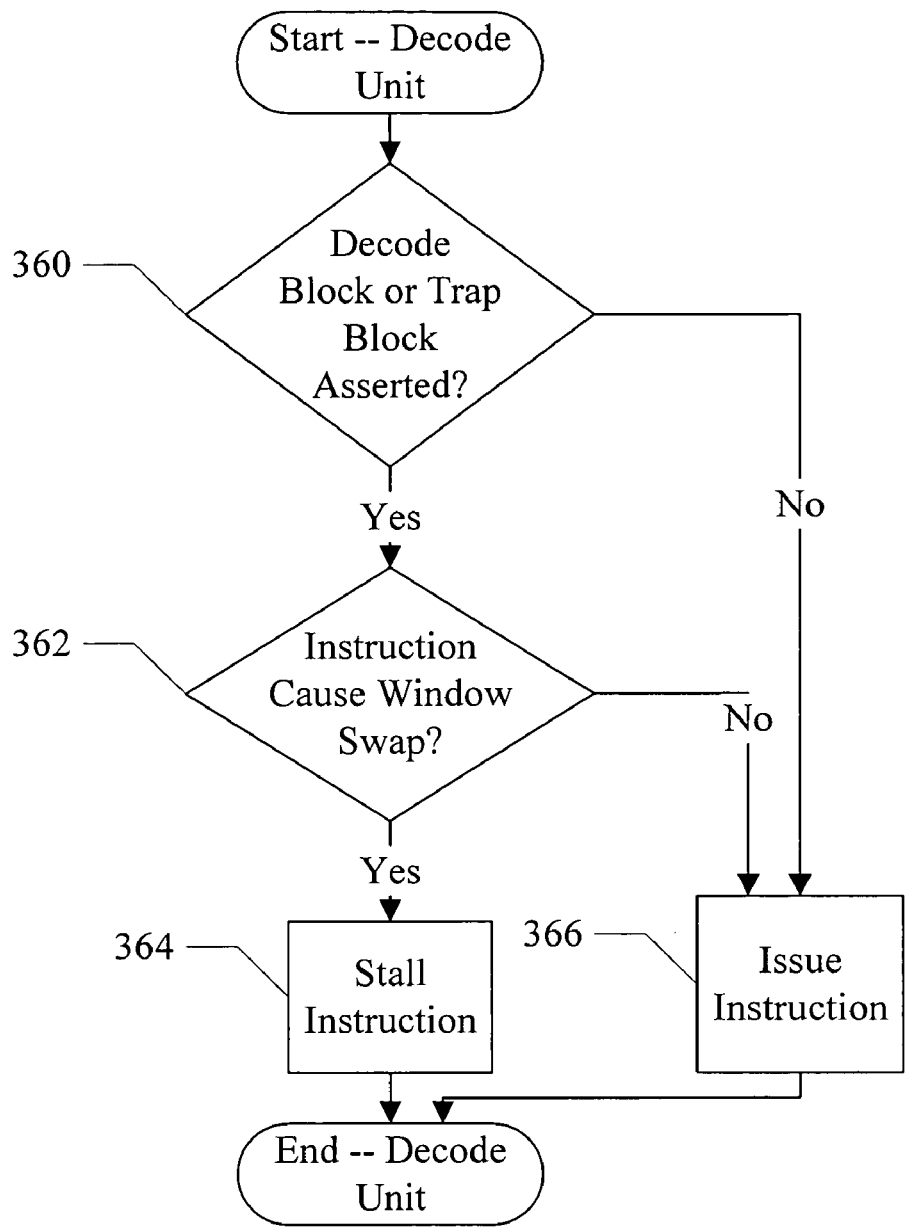
FIG. 12 is a flowchart illustrating operation of one embodiment of a decode unit in response to various block signals.

Turning next to FIG. 12, a flowchart is shown illustrating operation of one embodiment of the decode unit 208 for issuing or stalling an instruction responsive to the decode block and trap block signals. The flowchart may be illustrative of the operation of combinatorial logic in the decode unit 208. Thus, while the blocks are illustrated in a particular order for ease of understanding, blocks may be performed in parallel by the combinatorial logic. In other embodiments, blocks may be pipelined over two or more clock cycles (or the operation illustrated by the flowchart may be pipelined over two or more clock cycles), as desired. Furthermore, some blocks may be independent of other blocks. For example, decision blocks 360 and 362 may be independent and thus may represent parallel combinatorial logic.

If the decode block and/or trap block signals are asserted (decision block 360, "yes" leg) and the instruction being decoded causes a window swap (decision block 362, "yes" leg), the decode unit 208 stalls the instruction for the clock cycle (block 364). In this manner, the window swap hole is created in the clock cycle. The decode block and trap block signal assertions, in the present embodiment, may have been captured from the preceding clock cycle (e.g. as illustrated in the timing diagrams of FIGS. 9-11). Alternatively, the block signals may be used in the cycle received to block the issuance of an instruction.

On the other hand, if neither the decode block signal nor the trap block signal is asserted (decision block 360, "no" leg) or if one of the block signals is asserted and the instruction being decoded does not cause a window swap operation (decision block 360, "yes" leg and decision block 362, "no" leg), the decode unit 208 issues the instruction being decoded (block 366). If no instruction is being decoded in a given clock cycle, no instruction will be issued.

In one embodiment, the decode unit 208 may independently operate for each thread group, according to trap block and decode block signals corresponding to that thread group. That is, if thread group 0 is blocked (due to assertion of the decode block signal by the register management logic 330 in the execution unit 210A or assertion of a trap block signal corresponding to thread group 0 by the trap logic unit 270), a window swap instruction may still be issued in thread group 1 if block signals corresponding to thread group 1 are not asserted. Similarly, if thread group 1 is blocked (due to assertion of the decode block signal by the register management logic 330 in the execution unit 210B or assertion of a trap block signal corresponding to thread group 1 by the trap logic unit 270), a window swap instruction may still be issued in thread group 0 if block signals corresponding to thread group 0 are not asserted.

Figure 13:
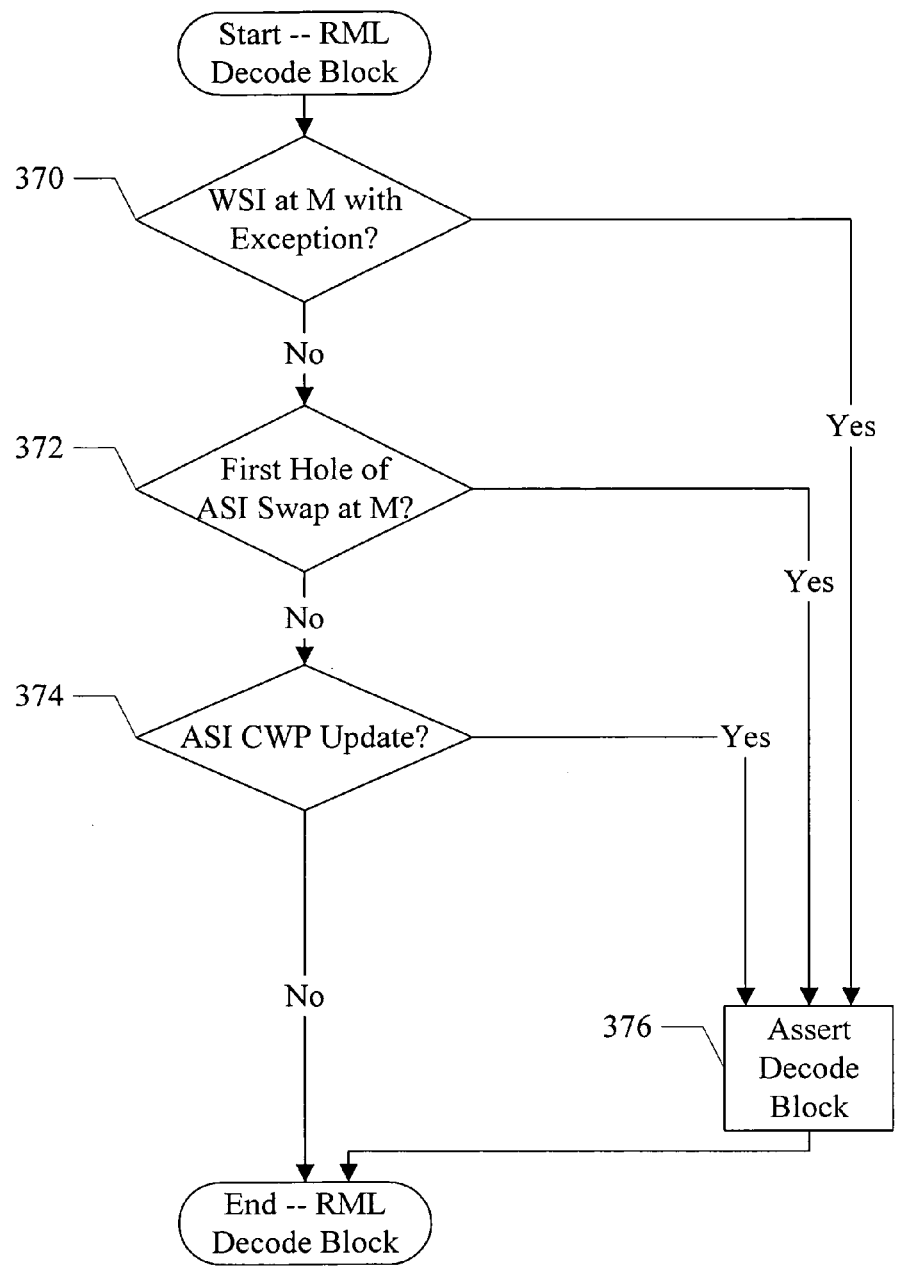
FIG. 13 is a flowchart illustrating operation of one embodiment of register management logic for generating a decode block signal.

Turning next to FIG. 13, a flowchart is shown illustrating operation of one embodiment of the register management logic 330 for generating the decode block signal. The flowchart may be illustrative of the operation of combinatorial logic in the register management logic 330. Thus, while the blocks are illustrated in a particular order for ease of understanding, blocks may be performed in parallel by the combinatorial logic. In other embodiments, blocks may be pipelined over two or more clock cycles (or the operation illustrated by the flowchart may be pipelined over two or more clock cycles), as desired. Furthermore, blocks may be independent and thus may be performed in parallel. For example, decision blocks 370, 372, and 374 may be independent and thus may represent parallel combinatorial logic.

The register management logic 330 may assert the decode block signal (block 376) if there is a window swap instruction at the M stage that has an exception that causes a switch to a non-adjacent window (decision block 370, "yes" leg), if the first window swap hole initiated for an ASI-initiated CWP update is at the M stage (decision block 372, "yes" leg), or if an ASI-initiated CWP update has been received on the ASI ring (decision block 374, "yes" leg). In some cases, prior to asserting the decode block signal to generate the first hole for an ASI-initiated CWP update (decision block 374), the register management logic 330 may ensure that no other higher-priority window swap operation is to be initiated. For example, if the first window swap operation of a TLU-initiated window swap operation is in progress or if an window swap instruction having an exception has been detected, the decode block signal for the ASI-initiated CWP update may not be asserted.

Figure 14:
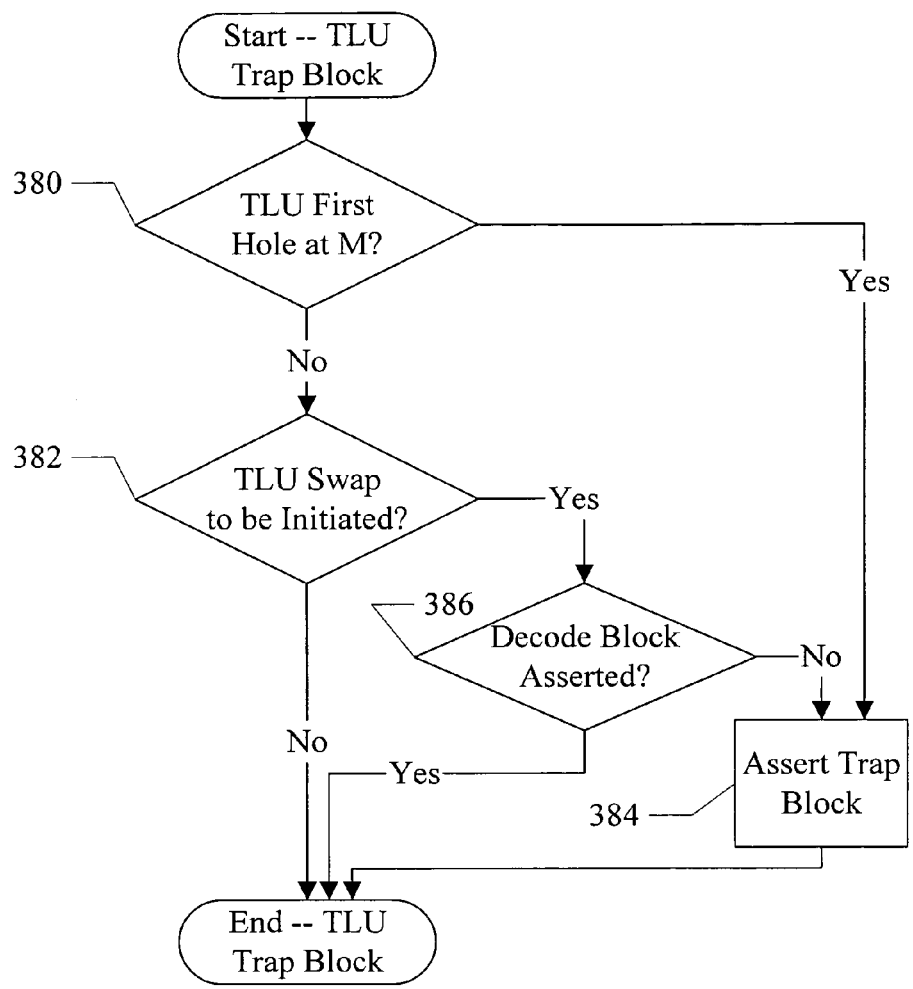
FIG. 14 is a flowchart illustrating operation of one embodiment of the trap logic unit for generating a trap block signal.

Turning now to FIG. 14, a flowchart is shown illustrating operation of one embodiment of the trap logic unit 270 for generating the trap block signal. The flowchart may be illustrative of the operation of combinatorial logic in the trap logic unit 270. Thus, while the blocks are illustrated in a particular order for ease of understanding, blocks may be performed in parallel by the combinatorial logic. In other embodiments, blocks may be pipelined over two or more clock cycles (or the operation illustrated by the flowchart may be pipelined over two or more clock cycles), as desired. Furthermore, blocks may be independent and thus may be performed in parallel. For example, decision blocks 380 and 382 may be independent and thus may represent parallel combinatorial logic. The trap logic unit 270 may implement independent circuitry similar to the flowchart of FIG. 14 for each thread group, to generate a trap block signal corresponding to that thread group, in some embodiments.

If the first window swap hole for a TLU-initiated window swap operation is at the M stage (decision block 380, "yes" leg), the trap logic unit 270 may assert the trap block signal (block 384) to generate the window swap hole for the second window swap operation. If the trap logic unit 270 has a window swap operation to be initiated (that is, the first window swap hole is to be created—decision block 382, "yes" leg), and the decode block signal is not asserted (decision block 386, "no" leg), the trap logic unit 270 may assert the trap block signal (block 384). On the other hand, if the trap logic unit 270 has a window swap operation to be initiated (decision block 382, "yes" leg) and the decode block signal is asserted (decision block 386, "yes" leg), the trap logic unit 270 may not assert the trap block signal.

Exemplary System Embodiment

Figure 15:
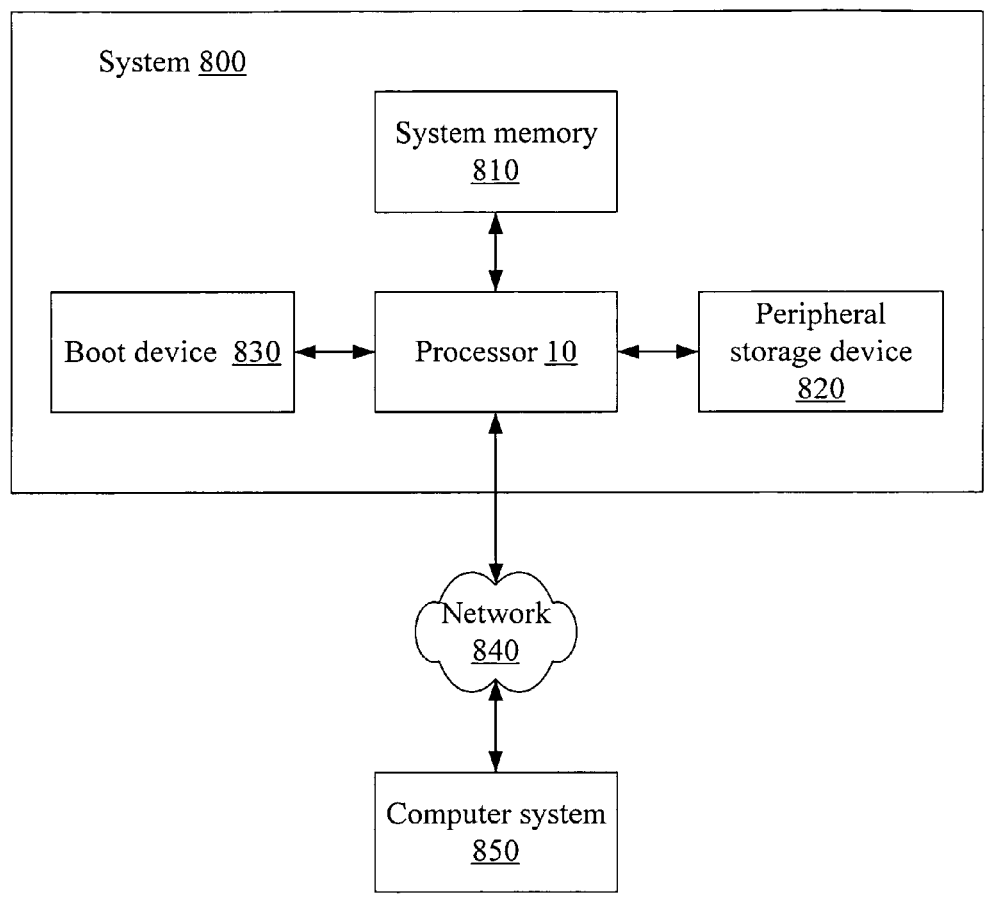
FIG. 15 is a block diagram of one embodiment of a computer system including the processor shown in FIG. 1.

As described above, in some embodiments processor 10 of FIG. 1 may be configured to interface with a number of external devices. One embodiment of a system including processor 10 is illustrated in FIG. 15. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
a register file having a swap interface to switch register windows in the register file;
register management logic coupled to the register file, wherein the register management logic is configured to control the swap interface in response to window swap operations; and
at least two sources of window swap operations, each of the at least two sources coupled to the register management logic, wherein the at least two sources and the register management logic are configured to cooperate according to an arbitration scheme to arbitrate between conflicting window swap operations to be performed using the swap interface, wherein the register management logic is configured to perform, on the swap interface, the window swap operation that wins the arbitration, and wherein a first source of the at least two sources comprises an execution unit configured to execute an instruction that causes at least two window swap operations if the instruction experiences an exception and wherein one of the at least two window swap operations is arbitrated using the arbitration scheme.

2. The processor as recited in claim 1 wherein another one of the at least two window swap operations is performed as part of the instruction execution.

3. The processor as recited in claim 1 wherein the first source is assigned a first priority level in the arbitration scheme.

4. The processor as recited in claim 3 wherein a second source of the at least two sources comprises a trap logic unit, wherein the trap logic unit is configured to initiate at least one window swap operation to complete a second instruction.

5. The processor as recited in claim 4 wherein the second source is assigned a second priority level that is lower than the first priority level in the arbitration scheme.

6. The processor as recited in claim 5 wherein a third source of the at least two sources comprises logic coupled to the register management logic, wherein the third source is configured, responsive to an instruction that directly updates a window pointer identifying a current window in the register file, to transmit a request to the register management logic, and wherein the register management logic is configured to generate at least one window swap operation responsive to the request.

7. The processor as recited in claim 6 wherein the third source is assigned a third priority level lower than the second priority level in the arbitration scheme.

8. The processor as recited in claim 1 wherein the at least two sources comprise a decode unit configured to decode instructions for execution, wherein the decode unit is configured to detect whether or not a decoded instruction causes at least one window swap operation during execution.

9. A processor comprising:
a register file;
register management logic coupled to the register file, wherein the register management logic is configured to control an interface to the register file to switch register windows in the register file in response to one or more window swap operations; and
at least two sources of window swap operations, each of the at least two sources coupled to the register management logic, wherein the at least two sources and the register management logic are configured to cooperate according to an arbitration scheme to arbitrate between conflicting window swap operations to be performed using the interface, and wherein one of the at least two sources comprises a decode unit configured to decode instructions for execution, wherein the decode unit is configured to detect whether or not a decoded instruction causes at least one window swap operation during execution, and wherein the arbitration scheme includes a block signal from the register management logic to the decode unit, wherein the register management logic is configured to assert the block signal if a higher priority window swap operation than the window swap operation of the decoded instruction is detected.

10. The processor as recited in claim 9 wherein the decode unit is configured to stall the decode instruction if the decoded instruction causes the at least one window swap operation and the block signal is asserted.

11. The processor as recited in claim 10 wherein the decode unit is configured not to stall the decoded instruction if the decoded instruction does not cause a window swap operation when executed, even if the block signal is asserted.

12. The processor as recited in claim 10 wherein the at least two sources comprises a trap logic unit, wherein the trap logic unit is configured to assert a second block signal to the decode unit if the trap logic unit is ready to source a window swap operation, and wherein the decode unit is configured to stall the decoded if the decoded instruction causes the at least one window swap operation and the second block signal is asserted.

13. The processor as recited in claim 1 wherein the conflicting window swap operations belong to different threads of a plurality of threads in a multithreaded processor, and wherein the different threads share access to the register file.

14. The processor as recited in claim 13 wherein the different threads have different state in the register file.

15. A method comprising:
cooperating in an arbitration scheme to arbitrate between conflicting window swap operations, wherein the cooperating is performed by at least two sources of window swap operations and register management logic, wherein each of the at least two window swap operations causes a swap of register window state in a register file;
determining a winning window swap operation according to the arbitration scheme; and
controlling an interface to the register file to switch register windows in the register file responsive to the winning window swap operation to perform the winning window swap operation, wherein the controlling is performed by the register management logic; and
wherein a first source of the at least two sources comprises an execution unit, and wherein the method further comprises executing an instruction in the execution unit, wherein the executing comprises causing at least two window swap operations if the instruction experiences an exception, and wherein one of the at least two window swap operations is arbitrated using the arbitration scheme.

16. The method as recited in claim 15 wherein a second source of the at least two sources comprises a trap logic unit, wherein the method further comprises initiating at least one window swap operation to complete a second instruction, wherein the initiating is performed by the trap logic unit.

17. The method as recited in claim 16 wherein a third source of the at least two sources comprises logic coupled to the register management logic, wherein, the method further comprises:
responsive to an instruction that directly updates a window pointer identifying a current window in the register file, transmitting a request from the third source to the register management logic; and
generating at least one window swap operation responsive to the request, wherein the generating is performed by the register management logic.

18. The method as recited in claim 15 wherein the conflicting window swap operations belong to different threads of a plurality of threads in a multithreaded processor, and wherein the different threads share access to the register file.

19. The method as recited in claim 18 wherein the different threads have different state in the register file.

* * * * *